US008423909B2

(12) United States Patent  
Zabielski

(10) Patent No.: US 8,423,909 B2  
(45) Date of Patent: Apr. 16, 2013

(54) SYSTEM AND METHOD FOR AN INTERACTIVE FILTER

(75) Inventor: Robert S Zabielski, Westborough, MA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 12/843,390

(22) Filed: Jul. 26, 2010

(65) Prior Publication Data  
US 2012/0023449 A1 Jan. 26, 2012

(51) Int. Cl.  
G06F 3/048 (2006.01)

(52) U.S. Cl.  
USPC ........... 715/825; 715/212; 715/217; 715/220; 715/767

(58) Field of Classification Search .......... 715/212–213, 715/808, 825, 217, 219, 220  
See application file for complete search history.

(56) References Cited

U.S. PATENT DOCUMENTS

| | | | |
|---|---|---|---|
| 5,390,296 A * | 2/1995 | Crandall et al. | 715/835 |
| 5,416,901 A | 5/1995 | Torres | |
| 5,506,946 A * | 4/1996 | Bar et al. | 345/600 |
| 5,602,934 A * | 2/1997 | Li et al. | 382/128 |
| 5,995,101 A * | 11/1999 | Clark et al. | 715/711 |
| 6,201,548 B1 * | 3/2001 | Cariffe et al. | 345/620 |
| 6,828,988 B2 | 12/2004 | Hudson et al. | |
| 7,363,584 B1 * | 4/2008 | Molesky | 715/210 |
| 7,607,102 B2 | 10/2009 | Ording et al. | |
| 2002/0118221 A1 * | 8/2002 | Hudson et al. | 345/711 |
| 2003/0222915 A1 | 12/2003 | Marion et al. | |
| 2006/0074866 A1 * | 4/2006 | Chamberlain et al. | 707/3 |
| 2006/0129914 A1 | 6/2006 | Ellis et al. | |
| 2008/0062202 A1 * | 3/2008 | Schulz et al. | 345/665 |
| 2008/0225153 A1 * | 9/2008 | Fagans | 348/333.01 |
| 2009/0125828 A1 | 5/2009 | Fried et al. | |
| 2009/0172516 A1 | 7/2009 | Gill | |
| 2009/0282354 A1 | 11/2009 | Poulson et al. | |
| 2010/0045879 A1 | 2/2010 | Chen | |

FOREIGN PATENT DOCUMENTS

CN 1755599 4/2006

OTHER PUBLICATIONS

"Drag and Drop Rearranging in Table Views with Core Data" Blog @ Tim Isted, available at http://www.timisted.net/blog/archive/core-data-drag-drop/, (Jul. 2008), 16 pages, last accessed Jul. 26, 2010.  
Chu et al. "Oracle® Application Development Framework" Developer's Guide, 10g Release 3 (10.1.3), available at http://download-west.oracle.com/docs/cd/B25221_04/web.1013/b25386/toc.htm, (Jan. 2006), 16 pages, last accessed Jul. 26, 2010.

* cited by examiner

*Primary Examiner* — Tuyetlien Tran  
*Assistant Examiner* — Patrick Ramsey  
(74) *Attorney, Agent, or Firm* — Jeffrey T. Holman

(57) ABSTRACT

A system applies an interactive filter. The system includes a data storage device, a display device, a user interface input device, and a processor. The data storage device stores data. The display device displays an initial representation of the data. The user interface input device facilitates a localized selection of a portion of the initial representation displayed on the display device. The localized selection is determined by hovering a navigation icon in alignment with a selection area corresponding to the portion of the initial representation. The processor dynamically applies a filter parameter to the portion of the initial representation based on the localized selection from the user interface input device.

17 Claims, 6 Drawing Sheets

|  | Col1 | Col2 | Col3 |
|---|---|---|---|
| Row1 | a | b | c |
| Row2 | d | e | f |
| Row3 | g | h | i |
| Row4 | j | k | l |
| Row5 | m | n | o |
| Row6 | p | q | r |

FIG. 2

|  | Col1 | Col2 | Col3 |
|---|---|---|---|
| Row1 | a | b | c |
| Row2 | d | e | f |
| Row3 | g | h | i |
| Row4 | j | k | l |
| Row5 | m | n | o |
| Row6 | p | q | r |

FIG. 3

|  | Col1 | Col2 | Col3 |
|---|---|---|---|
| Row1 | a | B | c |
| Row2 | d | E | f |
| Row3 | g | H | i |
| Row4 | j | K | l |
| Row5 | m | N | o |
| Row6 | p | Q | r |

| Filter1 |
|---|
| Filter2 |
| Filter3 |
| Filter4 |

FIG. 4

SYSTEM AND METHOD FOR AN INTERACTIVE FILTER

BACKGROUND

Data display interfaces are used to display data to a user so that the user can view and analyze the data. One example of a data display interface is a spreadsheet tool that displays content such as financial parameters in a table format. Other types of data display interfaces display different types of data in other structural and/or visual formats.

Conventional data display interfaces offer a variety of ways to vary the set of parameters that determine the particular set of data that is shown. Often, variation of these parameters replaces the entire displayed dataset. Replacing an entire dataset can consume more resources than otherwise might be necessary for a particular type of data analysis. Also, the relationships between successive states of the dataset can be hard to perceive.

Conventional data display interfaces address these types of problems by storing successions of datasets and allowing the user to successively view each of the datasets. For example, a user might use browser-style 'back' and 'forward' types of movements to change between the successions of datasets. However, this type of conventional navigation through successions of datasets is cumbersome and resource-intensive. Also, this type of conventional navigation through successions of datasets can make it difficult to see the changing effects of specific portions of the dataset.

SUMMARY

Embodiments of a system are described. In one embodiment, the system is a system to apply an interactive filter. An embodiment of the system includes a data storage device, a display device, a user interface input device, and a processor. The data storage device stores data. The display device displays an initial representation of the data. The user interface input device facilitates a localized selection of a portion of the initial representation displayed on the display device. The localized selection is determined by hovering a navigation icon in alignment with a selection area corresponding to the portion of the initial representation. The processor dynamically applies a filter parameter to the portion of the initial representation based on the localized selection from the user interface input device. Other embodiments of the system are also described. Embodiments of corresponding computer program products and methods are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 2 depicts a schematic diagram of one embodiment of an initial representation of data in a dataset.

FIG. 3 depicts a schematic diagram of one embodiment of designated regions relative to the initial representation of the data in the dataset.

FIG. 4 depicts a schematic diagram of one embodiment of an interactive filtering environment that may be implemented to generate a filtered representation of at least a portion of the data in the dataset. In particular, FIG. 4 depicts an interactive filtering operation to filter a column of data.

FIG. 5 depicts an interactive filtering operation to filter a row of data.

FIG. 6 depicts an interactive filtering operation to filter a single element of data.

FIG. 7 depicts an effect of movement of a navigation icon past various selection locations relative to the elements of the data in the dataset.

FIG. 8 depicts an interactive combined filtering operation based on a combination of filtering parameters.

FIG. 9 depicts a persistent application of the combined filtering parameters of FIG. 8.

FIG. 10 depicts the use of a separate window to display the results of an interactive filtering operation.

Throughout the description, similar reference numbers may be used to identify similar elements.

DETAILED DESCRIPTION

Figure 1:
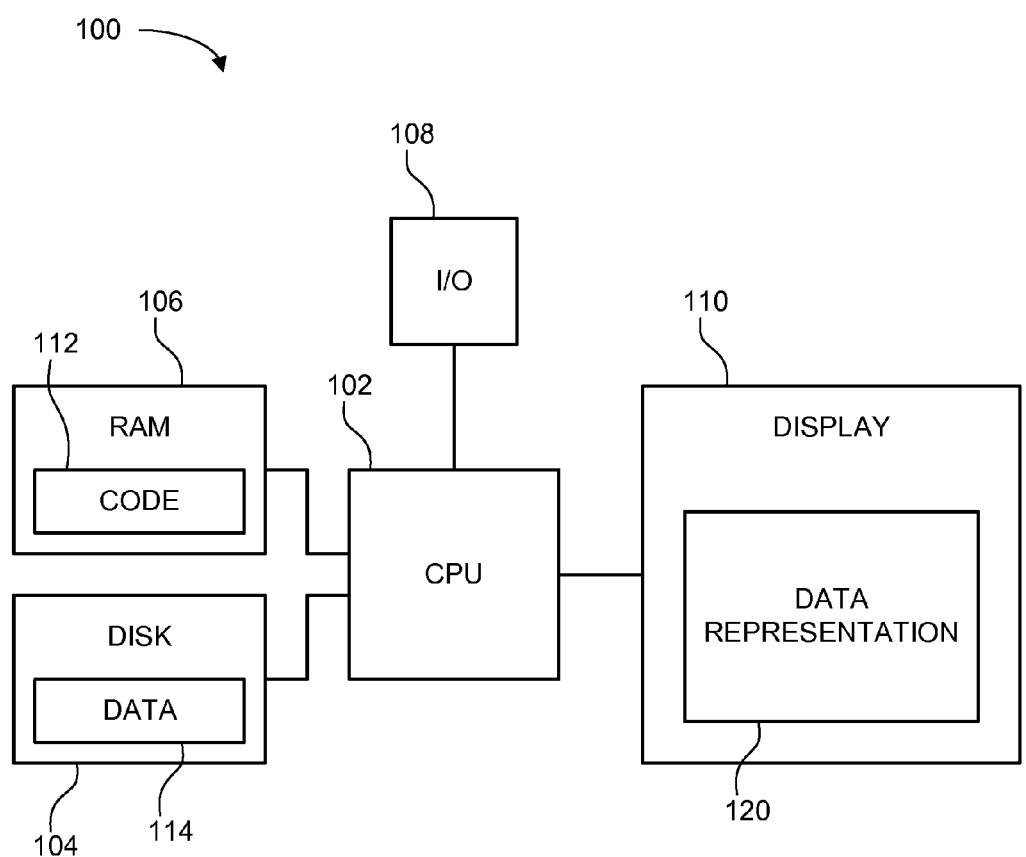
FIG. 1 depicts a schematic block diagram of one embodiment of system for implementing an interactive filter.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments apply an interactive filter to a localized selection of an initial representation of a dataset. In some embodiments, a visual token representing an additional filter or alternative parameter value can be moved across a data display to allow a user to perceive the localized effect of the variation on the dataset. This type of functionality introduces a partial-overlay of alternative-state information onto a current-state display. Embodiments of this approach for interactive filtering of localized information facilitates localized, in-place juxtaposition of varying states or a combination of states without replacing all or substantially all of the data in the dataset.

Some embodiments described herein are applicable to information displays whose layout remains the same when displaying different query results. Examples of such displays include geographic maps, online analytical processing (OLAP) cube browsers, spreadsheets, data forms, and so forth. However, other embodiments may be used with other types of information displays, including some types of displays whose layout may change with alternative-state information.

FIG. 1 depicts a schematic block diagram of one embodiment of system 100 for implementing an interactive filter. The illustrated system 100 includes a central processing unit (CPU) 102, a disk storage device 104, and a random access memory (RAM) device 106. The illustrated system 100 also includes an input/output (I/O) device 108 and a display device 110. Although the system 100 is shown and described with certain components and functionality, other embodiments of the system 100 may include fewer or more components to implement less or more functionality.

In general, the system 100 is configured to execute code 112 that facilitates displaying data 114 on the display device 110. The displayed data is referred to as a data representation 120. In some embodiments, the data 114 can be displayed by a variety of representations depending on the type of visual representation and formatting that is selected or implemented by a specific application executed by the code 112.

The CPU 102 is coupled to the disk storage device 104 and the RAM 106 via one or more electrical communication channels such as a bus. The exact type of communication channel(s) between the CPU 102 and the disk storage device 104 and/or the RAM 106 may include intermediate devices (not shown) such as disk and memory controllers and other similar devices.

In one embodiment, the CPU 102 executes instructions from the code 112 to implement general functionality of the system 100. Additionally, the CPU 102 may execute instructions from the code 112 to implement specific functionality related to the implementation of an interactive filter, as described herein. Alternatively, the CPU 102 may have its own resident memory (not shown) to store at least some of the code instructions that are executed by the CPU 102.

The disk storage device 104 stores the data 114 that is partially or fully displayed as the data representation 120 on the display device 110. Additionally, the disk storage device 104 may store other data that is related or unrelated to the data 114 used to generate the data representation 120. Although the disk storage device 104 is referenced, in some embodiments, as a disk, the disk storage device 104 is representative of a variety of data storage devices include disks and other non-disk type storage devices. Furthermore, in some embodiments, the data 114 may be obtained from another data storage device 104 that is located remotely from the system 100. For example, data may be obtained from a data stream over a network such as the internet.

The RAM 106 stores the code 112 that is executed by the CPU 102 to generate the data representation 120 on the display device 110. Although the RAM 106 is depicted in the system 100, other embodiments of the system 100 may implement other types of data memory devices which store some or all of the applicable code 112. For example, in some embodiments, at least a portion of the code 112 may be stored in a cache (not shown) that is separate from or integrated with the CPU 102.

The I/O device 108 is coupled to the CPU 102 via one or more I/O communication channels and or controllers (not shown). In a specific embodiment, the I/O device 108 includes a user input interface device. Some examples of user input interface devices include, but are not limited to, keyboards, touchpads, optical or other types of mouse devices, and so forth.

The display device 110 includes one or more display monitors such as a liquid crystal display (LCD) and/or a cathode ray tube (CRT) display. The display device 110 may be modular so that it is separate from, but electronically connects to the CPU 102 and other components of the system 100. Alternatively, the display device 110 may be integrated into the system 100, for example, in the form of a handheld computing device such as a personal digital assistant (PDA) or a mobile telephone.

In one embodiment, the interactive filtering is applied to the data representation 120 displayed on the display device 110. In order to display the data representation 120 on the display device 110, the CPU 102 retrieves the data 114 from the disk 104 and processes it according to the code 112 within the RAM 106. In one embodiment, the initial representation of the data on the display device 110 is specified by the code 112. In order to implement the interactive filtering, the user interface input device 108 facilitates a localized selection of a portion of the initial representation of the data displayed on the display device 110. In one embodiment, the localized selection is determined by hovering a navigation icon (e.g., a mouse cursor) in alignment with a selection area corresponding to a specific portion of the initial representation. One example of a selection area is shown in FIG. 3 and described in more detail below. One example of a navigation icon is shown in FIG. 4 and described in more detail below.

The term "hovering" refers to placing the navigation in alignment with a portion of the data representation 120. In some embodiments, hovering the navigation icon is independent of a navigation selection, in which the user implements a specific selection action with the navigation icon by, for example, clicking on content in the data representation 120. In some embodiments, the hovering action is substantially similar to a conventional mouseover action.

After the interactive filtering is initiated, the CPU 102 monitors the relative locations of the navigation icon and various selection areas in order to detect the alignment. Upon detection of the alignment, the CPU 102 dynamically applies a filter parameter to the portion of the initial representation based on the localized selection from the user interface input device 108. The representation that has the filter parameter applied is referred to herein as a filtered representation. Thus, the filtered representation is derived from the filter parameter being applied to the initial representation of the data.

In some embodiments, the CPU 102 dynamically applies the filter parameter in real-time to a portion of the initial representation in response to a movement of the navigation icon. The display device 110 correspondingly updates and displays the filtered representation in real-time as the navigation icon moves relative to various selection areas associated with different portions of the initial representation of the data.

In some embodiments, the CPU 102 instructs the display device 110 to generate a loupe display area (see FIG. 3) to display the filtered representation. The CPU 102 may dynamically configure a geometric characteristic of the loupe display area based on the pertinent contents of the initial representation. For example, in some embodiments the CPU 102 varies the size and/or shape of the loupe display area to accommodate different predefined areas of the displayed data.

FIG. 2 depicts a schematic diagram of one embodiment of an initial representation 122 of data in a dataset. The initial representation 122 is representative of one example of the way that the data 114 might be displayed on the display device 110. In the illustrated embodiment, the initial representation 122 is formatted as a table having rows 124 and columns 126 of data elements 128. For reference, the rows 124 are designated as Row1-Row6, although other embodiments may include a different number of rows. Also, the columns 126 are designated as Col1-Co13, although other embodiments may include a different number of columns. Also, the data elements 128 are designated as 'a' through 'r,' although other embodiments may include a different number of data elements.

Other embodiments may implement different types of data representations, depending on the type of data 114 to be displayed. For example, the data 114 may be represented in a graphical form, rather than in a numerical form. In some embodiments, the data 114 may be represented as a geographical or other type of map. There is no limitation on the types of representations that may be used to display the data 114, and the same or similar data may be represented in various distinct ways.

FIG. 3 depicts a schematic diagram of one embodiment of designated regions relative to the initial representation 122 of the data in the dataset. In particular, the illustrated embodiment shows a selection area 130 and a loupe display area 132. The selection area 130 corresponds to an area which is monitored by the CPU 102 for a hovering (e.g., mouseover) interaction with the navigation icon. The loupe display area 132 corresponds to an area to which a filter may be applied in response to the user's interaction with the selection area 130. Although shown as distinct areas in FIG. 3, in some embodiments, the selection area 130 and the loupe display area 132 have essentially the same geometric characteristics (i.e., location, size, shape, etc.). In other embodiments, the selection area 130 and the loupe display area 132 partially overlap. In other embodiments, the selection area 130 and the loupe display area 132 do not overlap.

FIG. 4 depicts a schematic diagram of one embodiment of an interactive filtering environment 140 that may be implemented to generate a filtered representation 142 of at least a portion of the data in the dataset. In particular, FIG. 4 depicts an interactive filtering operation to filter a column 126 of data.

The illustrated interactive filtering environment 140 includes the filtered representation 142 and one or more filter parameters 144. For reference, the filter parameters 144 are designated as Filter1-Filter4, although other embodiments may have a different number of filter parameters. The interactive filtering environment 140 also includes a navigation icon 146, which is illustrated as a mouse cursor arrow.

Prior to generating the filtered representation 142, the interactive filtering environment 140 displays the initial representation 122. Upon selection of a filter parameter 144 by a user, the CPU 102 begins monitoring for alignment of the navigation icon 146 with one or more selection areas 130 (refer to FIG. 2). In the illustrated embodiment, each of the table cells may be a separate selection area 130.

Depending on the selection area 130 that the navigation icon 146 is aligned with in a hovering (e.g., mouseover) action, the CPU 102 dynamically executes corresponding filtering operations. For example, alignment of the navigation icon 146 with a selection area 130 at the empty cell in the top left corner may correspond to a loupe display area 132 of substantially the whole data set. Alignment of the navigation icon 146 with any of the selection areas 130 at the column headers may correspond to loupe display areas 132 of the corresponding columns 126. Similarly, alignment of the navigation icon 146 with any of the selection areas 130 at the row headers may correspond to loupe display areas 132 of the corresponding rows 124. Alignment of the navigation icon 146 with any of the selection areas 130 at the remaining data elements 128 may correspond to loupe display areas 132 of the corresponding individual data element 128.

In the illustrated embodiment, 'Filter4' is selected (as shown by the dashed navigation icon). The navigation icon 146 is subsequently moved (as shown by the dashed line) into alignment with the column header 'Col2' for the second column. Upon detecting the alignment of the navigation icon 146 with 'Col2,' the CPU 102 overlays filtered data on top of the initial data in that column 126. For reference, the filtered data shown in FIG. 4 is designated as 'B,' 'E,' 'H,' 'K,' 'N,' and 'Q.'

Although the filtered data in FIG. 4 is shown overlaying the initial data, in some embodiments the filtered data may be shown in another location. Also, the filtered data may be shown in a manner to obscure the original data or, alternatively, in a partially transparent manner to augment the initial data. When shown in a partially transparent manner, the filtered data may overlay some or substantially all of the initial data in a semi-transparent manner or, alternatively, may overlay select portions of the initial data in an obscure manner while maintaining other portions of the initial data visible.

In some embodiments, the boundary of the loupe display area 132 is visually distinguishable. In the illustrated embodiment, the boundary of the loupe display area 132 is identified by the transition between the shaded (filtered) and non-shaded (non-filtered) portions of the data. In other embodiments, other types of visual indicators may be used to identify the boundary of the loupe display area 132 relative to the unfiltered portions of the initial representation 122. For example, a dashed line may be used to designate the boundary (similar to FIG. 3), and the shading may be omitted. In other embodiments, other types of visual highlighting and/or delineations may be used.

Figure 5:
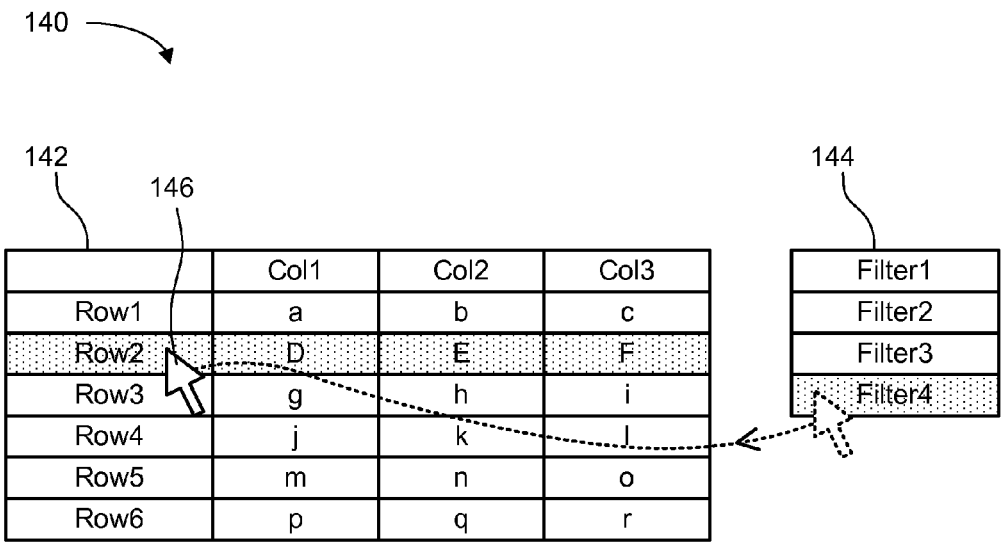
FIG. 5 depicts a schematic diagram of another embodiment of an interactive filtering environment that may be implemented to generate a filtered representation of at least a portion of the data in the dataset. In particular.

FIG. 5 depicts a schematic diagram of another embodiment of an interactive filtering environment 140 that may be implemented to generate a filtered representation 142 of at least a portion of the data in the dataset. In particular, FIG. 5 depicts an interactive filtering operation to filter a row 124 of data.

In the illustrated embodiment, 'Filter4' is selected (as shown by the dashed navigation icon). The navigation icon 146 is subsequently moved (as shown by the dashed line) into alignment with the row header 'Row2' for the second row 124. Upon detecting the alignment of the navigation icon 146 with 'Row2,' the CPU 102 overlays filtered data on top of the initial data in that row 124. For reference, the filtered data shown in FIG. 5 is designated as 'D,' 'E,' and 'F.'

Figure 6:
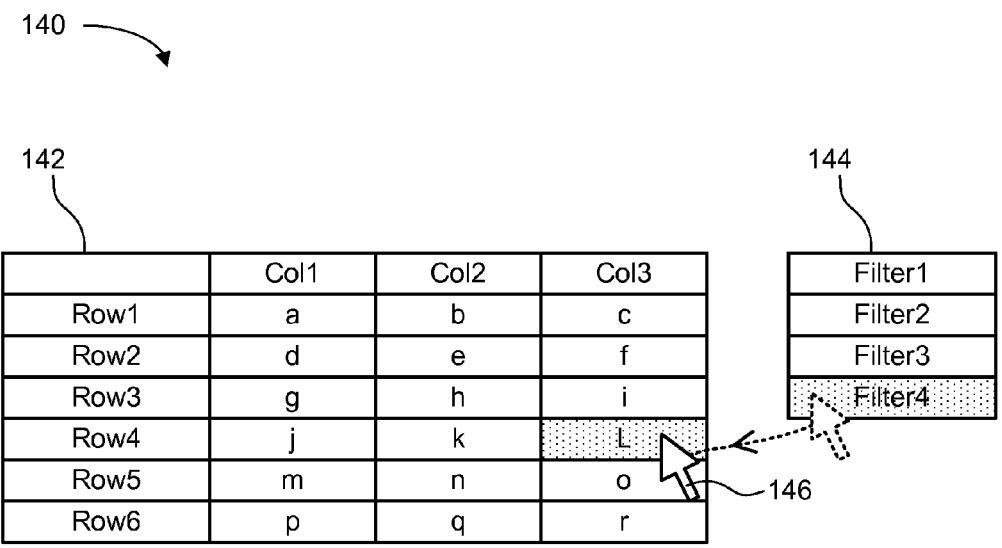
FIG. 6 depicts a schematic diagram of another embodiment of an interactive filtering environment that may be implemented to generate a filtered representation of at least a portion of the data in the dataset. In particular.

FIG. 6 depicts a schematic diagram of another embodiment of an interactive filtering environment 140 that may be implemented to generate a filtered representation 142 of at least a portion of the data in the dataset. In particular, FIG. 6 depicts an interactive filtering operation to filter a single element 128 of data.

In the illustrated embodiment, 'Filter4' is selected (as shown by the dashed navigation icon). The navigation icon 146 is subsequently moved (as shown by the dashed line) into alignment with the data element '1.' Upon detecting the alignment of the navigation icon 146 with '1,' the CPU 102 overlays filtered data on top of the initial data in that row 124. For reference, the filtered data shown in FIG. 6 is designated as 'L.'

The examples illustrated in FIGS. 4-6 show how a geometric characteristic of the loupe display area 132 can be dynamically configurable based on contents of the corresponding portion of the initial representation 122. Although the selection area 130 in each of these examples corresponds to approximately a single cell within the depicted table, the size and shape of the loupe display area 132 changes depending on which selection area 130 is activated or in alignment with the navigation icon 146.

Figure 7:
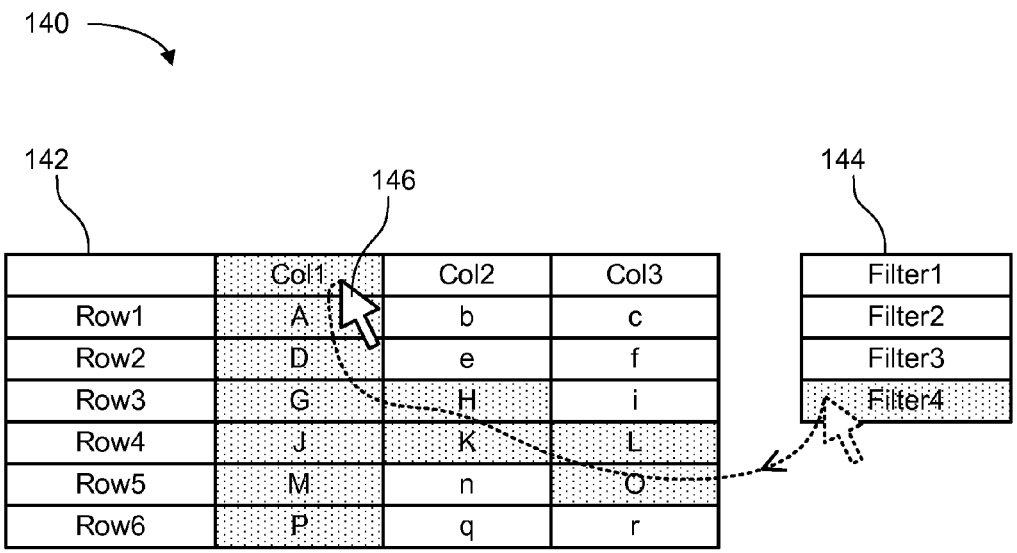
FIG. 7 depicts a schematic diagram of another embodiment of an interactive filtering environment that may be implemented to generate a filtered representation of at least a portion of the data in the dataset. In particular.

FIG. 7 depicts a schematic diagram of another embodiment of an interactive filtering environment 140 that may be implemented to generate a filtered representation 142 of at least a portion of the data in the dataset. In particular, FIG. 7 depicts an effect of movement of the navigation icon 146 past various selection locations 130 relative to the elements 128 of the data in the dataset.

In the illustrated embodiment, 'Filter4' is selected (as shown by the dashed navigation icon). The navigation icon 146 is subsequently moved (as shown by the dashed line) into alignment with a series of data elements 128. At each data element 128 with a corresponding loupe display area 132, the CPU 102 shows the filter parameter applied to content of the corresponding loupe display area 132. The following table outlines one example of the alignment sequence of the navigation icon 146 with the various data elements 128. The table also indicates one or more interactive filtering actions associated with each detection stage.

| Detection Stage | Selection Area | Loupe Display Area | Interactive Filtering Action |
| --- | --- | --- | --- |
| 1 | Row5-Col3 | Row5-Col3 | Show 'O' |
| 2 | Row4-Col3 | Row4-Col3 | Show 'L' |
| 3 | Row4-Col2 | Row4-Col2 | Show 'K' |

-continued

| Detection Stage | Selection Area | Loupe Display Area | Interactive Filtering Action |
| --- | --- | --- | --- |
| 4 | Row3-Col2 | Row3-Col2 | Show 'H' |
| 5 | Row3-Col1 | Row3-Col1 | Show 'G' |
| 6 | Row2-Col1 | Row2-Col1 | Show 'D' |
| 7 | Row1-Col1 | Row1-Col1 | Show 'A' |
| 8 | Col1 | Col1 | Show 'A' 'D' 'G' 'J' 'M' 'P' |

For reference, in the foregoing table, the selection area 130 for individual data elements 128 is designated by the intersection of the corresponding row 124 and column 126. In contrast, the selection area 130 for an entire column 126 is designated by the column header (e.g., 'Col1'). Also for reference, the loupe display area 132 is designated by the intersection of the row 124 and column 126 for an individual data element 128. In contrast, if the loupe display area 132 corresponds to all of the cells in a column 126, then the loupe display area 132 is designated simply by the column header (e.g., 'Col1'). Thus, in some embodiments, the use of the column header to designate a selection area 130 may correspond to the single cell of the column header, while the use of the column header to designate a loupe display area 132 may correspond to the entire column.

Also, in some embodiments, the filtering effect of a loupe display area 132 is only apparent during approximately the time that the navigation icon 146 is aligned with the corresponding selection area 130. Once the navigation icon 146 is no longer aligned with the selection area 130, then the corresponding loupe display area 132 disappears, or returns to show the initial data. In the table above, this temporary nature of the filtering effect is explained by showing the initial data in the detection stage following removal of the navigation icon 146 from alignment with the corresponding selection area 130. For example, when the navigation icon 146 moves out of alignment with the cell showing filtered data 'O,' then the filtered data 'O' is removed so that the initial data 'o' is visible again. For the sake of simplicity, this reversion back to the initial data is not depicted in the embodiment shown in FIG. 7.

In alternative embodiments, the filtering effect could be persistent for a longer period of time. For example, the filtering effect could be persistent for a predetermined amount of time after the alignment is no longer present. In another example, the filtering effect could be persistent until the user makes a selection or provides specific input instructions to remove the filtering effect. Other embodiments may use other methods to allow the filtering effect to persist for shorter or longer periods of time.

Figure 8:
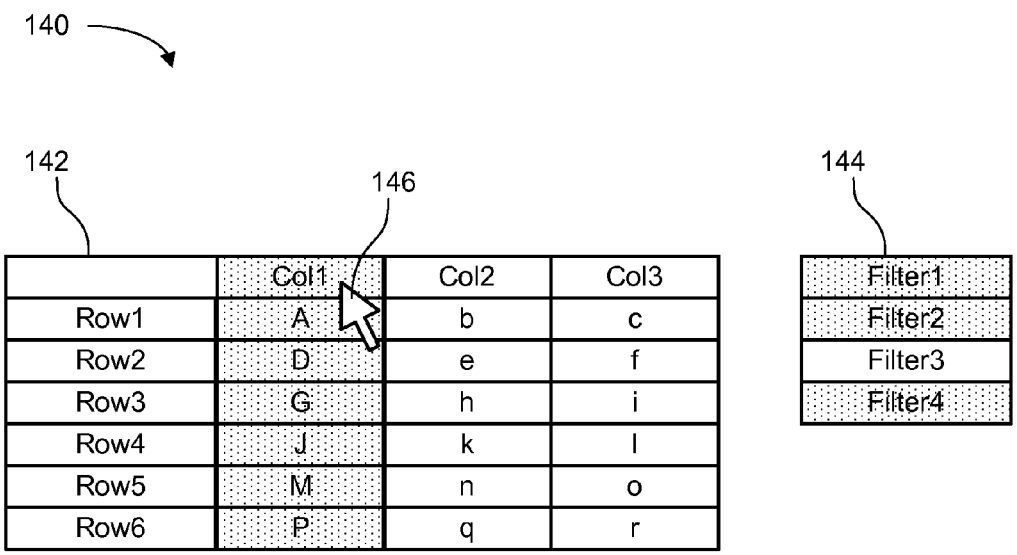
FIG. 8 depicts a schematic diagram of another embodiment of an interactive filtering environment that may be implemented to generate a filtered representation of at least a portion of the data in the dataset. In particular.

FIG. 8 depicts a schematic diagram of another embodiment of an interactive filtering environment 140 that may be implemented to generate a filtered representation 142 of at least a portion of the data in the dataset. In particular, FIG. 8 depicts an interactive combined filtering operation based on a combination of filtering parameters 144. In the illustrated embodiment, a combination of the filter parameters 'Filter1,' 'Filter2,' and 'Filter4' are applied to the loupe display area 132 corresponding to the selection area 'Col1.' In this way, the system 100 can display a plurality of filter parameters 144 available for selection, either individually or in combination, for dynamic application to the corresponding portion of the initial representation 122.

Figure 9:
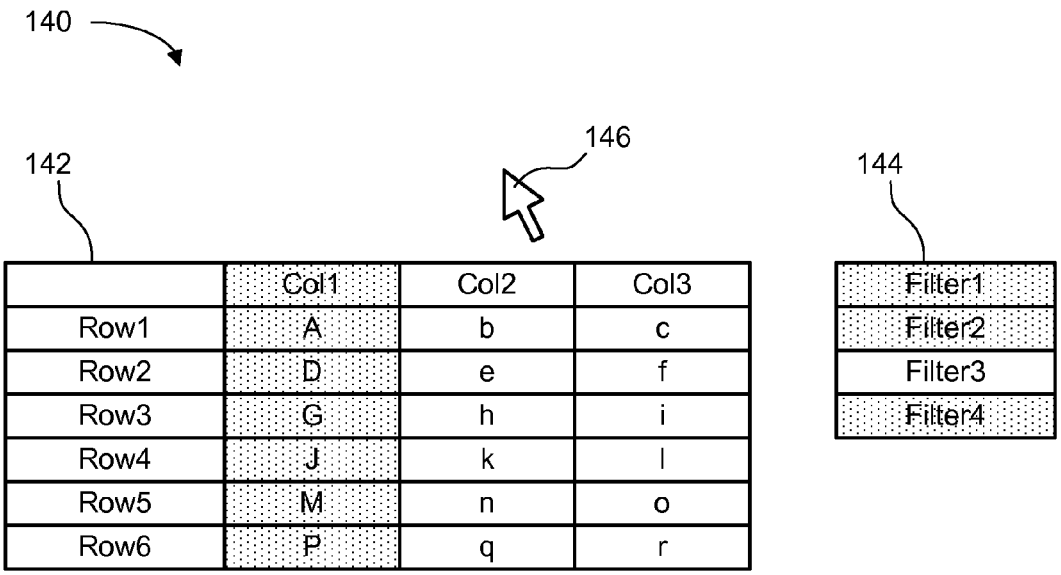
FIG. 9 depicts a schematic diagram of another embodiment of an interactive filtering environment that may be implemented to generate a filtered representation of at least a portion of the data in the dataset. In particular.

FIG. 9 depicts a schematic diagram of another embodiment of an interactive filtering environment 140 that may be implemented to generate a filtered representation 142 of at least a portion of the data in the dataset. In particular, FIG. 9 depicts a persistent application of the combined filtering parameters of FIG. 8. Specifically, the filtering effects on the loupe display area 132 corresponding to the selection area 'Col1' remain even after the navigation icon 146 is moved away from the selection area 'Col1.' In one embodiment, the persistent application of one or more filtering parameters 144 depends on a user selection (e.g., a mouse click) within the selection area 130. In this way, the system 100 is capable of generating a modified representation of the portion of the initial representation 122 of the data to adjoin the applied filter parameter(s) 144 to the initial representation 122 of the data in response to a further selection operation by the user. In some embodiments, the modified representation persists after the navigation icon 146 discontinues alignment with the selection area 130 corresponding to the portion of the initial representation 122.

Figure 10:
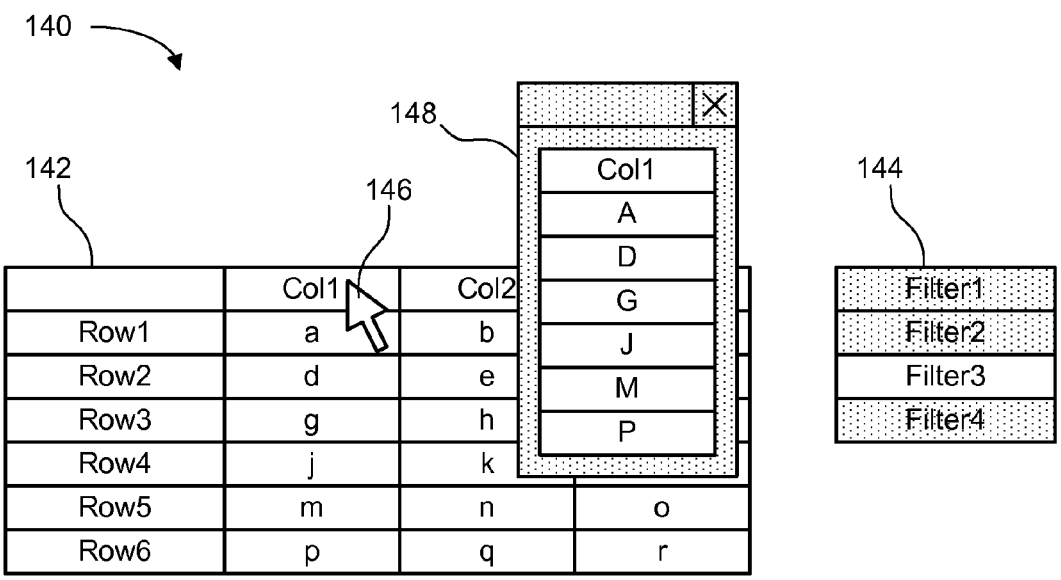
FIG. 10 depicts a schematic diagram of another embodiment of an interactive filtering environment that may be implemented to generate a filtered representation of at least a portion of the data in the dataset. In particular.

FIG. 10 depicts a schematic diagram of another embodiment of an interactive filtering environment 140 that may be implemented to generate a filtered representation 142 of at least a portion of the data in the dataset. In particular, FIG. 10 depicts the use of a separate window 148 to display the results of an interactive filtering operation. In some embodiments, the loupe display area 132 is displayed in a separate window 148 that is separate from and moveable relative to the portion of the initial representation 122. This may allow the filtering effect to be viewed simultaneously with the initial data.

Figure 11:
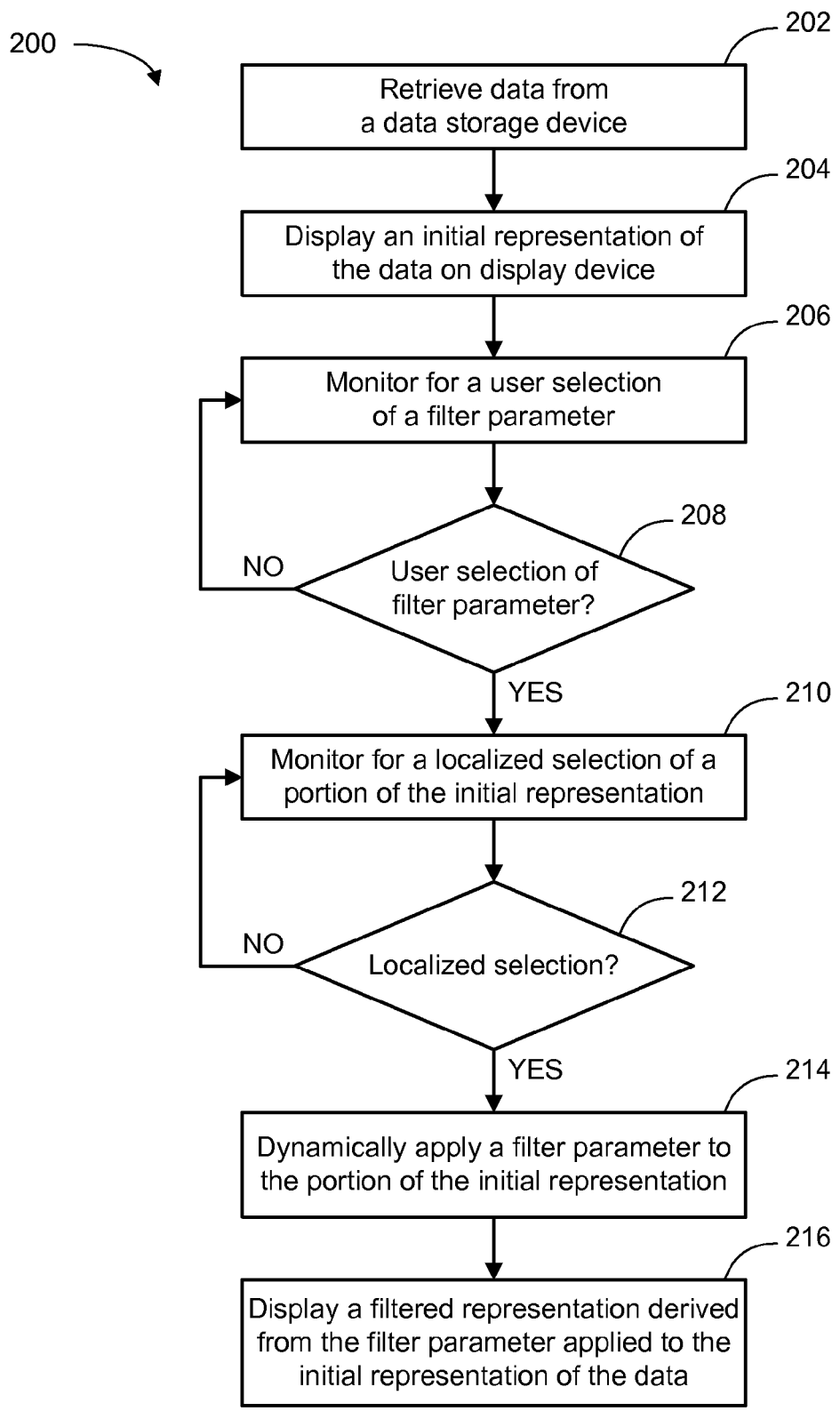
FIG. 11 depicts a schematic diagram of one embodiment of a method for implementing an interactive filter.

FIG. 11 depicts a schematic diagram of one embodiment of a method 200 for implementing an interactive filter. Although the method 200 is described in conjunction with the system 100 of FIG. 1, embodiments of the method 200 may be implemented with other types of systems capable of performing similar interactive filtering operations.

In the illustrated method 200, the CPU 102 retrieves 202 data 114 from a data storage device 104. The CPU 102 then sends the data 114 in some form to the display device 110 to display 204 an initial representation 122 of the data. The CPU 102 then monitors 206 for a user selection of one or more filter parameters 144. In response to detecting 208 a user selection of a filter parameter 144, the CPU 102 monitors 210 for a localized selection of at least a portion of the initial representation 122. As explained above, in some embodiments the localized selection results from aligning a navigation icon with predetermined selection area 130. In response to detecting 212 a localized selection, the CPU 102 dynamically applies 214 the selected filter parameter(s) 144 to the corresponding loupe display area 132 of the initial representation 122. This results in displaying 216 a filtered representation 142 of at least a portion of the initial representation 122. The filtered representation 142 is derived from the selected filter parameter(s) being applied to the initial representation 122 of the data 114. The depicted method 200 then ends. Other embodiments of the method 200 may include further operation related to the functionality described herein.

Embodiments described herein can be used in various ways for creative and informative ways of filtering data. In some embodiments, the interactive filtering techniques described herein can be applied to hierarchical models in which different hierarchical parameters can be dynamically applied to a single set of data to see the effects of each parameter on some or all of the data. In some embodiments, a drag-and-drop gesture can be used to apply the filter parameter(s) to the initial data. In some embodiments, a token can be used as a visual cue that the interactive filtering is active and/or applied to a specific portion of the data. Thus, embodiments described herein create a type of interactive, attribute-based filter effect.

In other embodiments, some or all of the interactive filtering techniques described herein can be applied to multi-dimensional datasets.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

An embodiment of an interactive filtering system includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations for interactive filtering. Examples of some of the potential operations are explained above with respect to the system 100 and the method 200.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from and/or comprising a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program for an interactive filter, wherein the computer readable program, when executed on a computer, causes the computer to perform operations comprising:
   retrieving data from a data storage device;
   displaying an initial representation of the data on a display device, wherein the initial representation of the data comprises a plurality of visually separate selection areas;
   dynamically applying a filter parameter to a portion of the initial representation based on a localized selection of the portion of the initial representation, wherein the localized selection is determined by hovering a navigation icon in alignment with, and without an additional user selection of, one or more of the visually separate selection areas corresponding to the portion of the initial representation; and
   implementing a loupe display area to display a filtered representation of the portion of the initial representation, wherein the filtered representation is derived from the filter parameter applied to the initial representation of the data, wherein the loupe display area is displayed in a separate window that is separate from and moveable relative to the portion of the initial representation.

2. The computer program product of claim 1, wherein the computer readable program, when executed on the computer, causes the computer to perform further operations comprising:
   dynamically applying the filter parameter in real-time to the portion of the initial representation; and
   updating and displaying the filtered representation in real-time as the navigation icon moves relative to a plurality of selection areas associated with a corresponding plurality of portions of the initial representation of the data.

3. The computer program product of claim 1, wherein the loupe display area overlays the portion of the initial representation so that the filtered representation overlays the portion of the initial representation.

4. The computer program product of claim 1, wherein a geometric characteristic of the loupe display area is dynamically configurable based on boundaries of the one or more visually separate selection areas of the portion of the initial representation.

5. The computer program product of claim 1, wherein the computer readable program, when executed on the computer, causes the computer to perform further operations comprising generating a visual indicator of a boundary of the loupe display area based on boundaries of the one or more visually separate selection areas of the portion of the initial representation displayed on the display device.

6. The computer program product of claim 1, wherein the computer readable program, when executed on the computer, causes the computer to perform further operations comprising displaying a plurality of filter parameters available for selection and dynamic application to the portion of the initial representation.

7. The computer program product of claim 1, wherein the computer readable program, when executed on the computer, causes the computer to perform further operations comprising:
   temporarily applying the filter parameter to the portion of the initial representation while the navigation icon is in alignment with the one or more visually separate selection areas corresponding to the portion of the initial representation; and
   removing the application of the filter parameter from the initial representation of the data in response to a determination that the navigation icon discontinues alignment with the one or more visually separate selection areas corresponding to the portion of the initial representation.

8. The computer program product of claim 1, wherein the computer readable program, when executed on the computer, causes the computer to perform further operations comprising generating a modified representation of the portion of the initial representation of the data to adjoin the applied filter parameter to the initial representation of the data in response to a further selection operation, wherein the modified representation persists after the navigation icon discontinues alignment with the one or more visually separate selection areas corresponding to the portion of the initial representation.

9. A system for applying an interactive filter, the system comprising:
   a data storage device to store data;
   a display device coupled to the data storage device, wherein the display device is configured to display an initial representation of the data, wherein the initial representation of the data comprises a plurality of visually separate selection areas;
   a user interface input device to facilitate a localized selection of a portion of the initial representation displayed on the display device, wherein the localized selection is determined by hovering a navigation icon in alignment with, and without an additional user selection of, one or more of the visually separate selection areas corresponding to the portion of the initial representation; and
   a processor coupled to the user interface input device, wherein the processor is configured to dynamically apply a filter parameter to the portion of the initial representation based on the localized selection from the user interface input device;
   wherein the display is further configured to display a loupe display area to display a filtered representation of the portion of the initial representation, wherein the loupe display area is displayed in a separate window that is separate from and moveable relative to the portion of the initial representation.

10. The system of claim 9, wherein the filtered representation is derived from the filter parameter applied to the initial representation of the data.

11. The system of claim 9, wherein the processor is further configured to dynamically apply the filter parameter in real-time to the portion of the initial representation in response to a movement of the navigation icon, and the display is further configured to update and display the filtered representation in real-time as the navigation icon moves relative to a plurality of selection areas associated with a corresponding plurality of portions of the initial representation of the data.

12. The system of claim 9, wherein the processor is further configured to dynamically configure a geometric characteristic of the loupe display area based on boundaries of the one or more visually separate selection areas of the portion of the initial representation.

13. A method comprising:
retrieving data from a data storage device;
displaying an initial representation of the data on a display device, wherein the initial representation of the data comprises a plurality of visually separate selection areas;
dynamically applying a filter parameter to a portion of the initial representation based on a localized selection of the portion of the initial representation, wherein the localized selection is determined by hovering a navigation icon in alignment with, and without an additional user selection of, one or more of the visually separate selection areas corresponding to the portion of the initial representation; and
implementing a loupe display area to display a filtered representation of the portion of the initial representation, wherein the filtered representation is derived from the filter parameter applied to the initial representation of the data, wherein the loupe display area is displayed in a separate window that is separate from and moveable relative to the portion of the initial representation.

14. The method of claim 13, further comprising:
dynamically applying the filter parameter in real-time to the portion of the initial representation; and
updating and displaying the filtered representation in real-time as the navigation icon moves relative to a plurality of selection areas associated with a corresponding plurality of portions of the initial representation of the data.

15. The method of claim 13, wherein a geometric characteristic of the loupe display area is dynamically configurable based on boundaries of the one or more visually separate selection areas of the portion of the initial representation.

16. The method of claim 13, further comprising:
temporarily applying the filter parameter to the portion of the initial representation while the navigation icon is in alignment with the one or more visually separate selection areas corresponding to the portion of the initial representation; and
removing the application of the filter parameter from the initial representation of the data in response to a determination that the navigation icon discontinues alignment with the one or more visually separate selection areas corresponding to the portion of the initial representation.

17. The method of claim 13, further comprising generating a modified representation of the portion of the initial representation of the data to adjoin the applied filter parameter to the initial representation of the data in response to a further selection operation, wherein the modified representation persists after the navigation icon discontinues alignment with the one or more visually separate selection areas corresponding to the portion of the initial representation.

* * * * *